(12) United States Patent
Kang et al.

(10) Patent No.: US 7,760,290 B2
(45) Date of Patent: Jul. 20, 2010

(54) MULTI-REFLECTING DEVICE AND BACKLIGHT UNIT AND DISPLAY DEVICE HAVING MULTI-REFLECTING ARCHITECTURE

(76) Inventors: Bong Sup Kang, #101-1702 Posco The Sharp, 902, Dachi-4-dong, Gangnam-gu, Seoul 135-841 (KR); Young Ju Kang, #101-1702 Posco The Sharp, 902, Dachi-4-dong, Gangnam-gu, Seoul 135-841 (KR)

( * ) Notice: Subject to any disclaimer, the term of this patent is extended or adjusted under 35 U.S.C. 154(b) by 222 days.

(21) Appl. No.: 11/910,692

(22) PCT Filed: Feb. 23, 2006

(86) PCT No.: PCT/KR2006/000616

§ 371 (c)(1),
(2), (4) Date: Oct. 4, 2007

(87) PCT Pub. No.: WO2006/107138

PCT Pub. Date: Oct. 12, 2006

(65) Prior Publication Data

US 2008/0165306 A1    Jul. 10, 2008

(30) Foreign Application Priority Data

| Apr. 8, 2005 | (KR) | ........................ 10-2005-0029498 |
| May 9, 2005 | (KR) | ........................ 10-2005-0038390 |
| May 9, 2005 | (KR) | ........................ 10-2005-0038391 |

(51) Int. Cl.
*G02F 1/1335* (2006.01)
*G03B 21/26* (2006.01)

(52) U.S. Cl. ............................ 349/62; 349/113; 353/37
(58) Field of Classification Search .................. 349/62, 349/113; 353/37
See application file for complete search history.

(56) References Cited

U.S. PATENT DOCUMENTS

| 4,909,601 | A | * | 3/1990 | Yajima et al. | ................... 349/8 |
| 5,528,720 | A | * | 6/1996 | Winston et al. | ............. 385/146 |
| 6,044,196 | A | * | 3/2000 | Winston et al. | ............. 385/146 |
| 6,979,095 | B2 | * | 12/2005 | Min et al. | ................... 362/611 |
| 7,038,641 | B2 | * | 5/2006 | Hirota et al. | ................... 345/83 |
| 2004/0130880 | A1 | | 7/2004 | Min et al. | |

FOREIGN PATENT DOCUMENTS

| CN | 1517759 A | | 8/2004 |
| JP | 7-159623 A | | 6/1995 |
| JP | 07-294745 A | | 11/1995 |
| JP | 07294745 A | * | 11/1995 |
| JP | 10-293304 A | | 11/1998 |
| JP | 10293304 A | * | 11/1998 |
| JP | 11-339527 A | | 12/1999 |
| JP | 2002-319308 A | | 10/2002 |
| KR | 309634 B | | 4/2003 |

* cited by examiner

*Primary Examiner*—Mike Qi
(74) *Attorney, Agent, or Firm*—Birch, Stewart, Kolasch & Birch, LLP

(57) ABSTRACT

A multi-reflecting device includes a plurality of double reflecting surfaces formed serially on the rear of a light guide plate having a taper shape. A light incident upon the light guide plate is double-reflected, and progress in a desired direction. The multi-reflecting structure is applied to a backlight unit and a display device so that the backlight unit and the display device can be slimmer economically.

22 Claims, 10 Drawing Sheets

MULTI-REFLECTING DEVICE AND BACKLIGHT UNIT AND DISPLAY DEVICE HAVING MULTI-REFLECTING ARCHITECTURE

BACKGROUND OF THE INVENTION

1. Field of the Invention

The present invention generally relates to an optical device configured to magnify and reflect an incident light. More specifically, the present invention relates to a multi-reflecting device configured to magnify and emit the incident light in a desired direction with a more slimmed size, a backlight unit and a display device having a multi-reflecting structure configured to multi-reflect an incident light.

2. Description of the Related Art

In general, display devices have been required to be smaller and flatter and to have low power consumption. Of these display devices, a liquid crystal display controls an electric field applied to a liquid material having a dielectric anisotropy to penetrate or intercept a light, thereby displaying an image or a picture. However, the liquid crystal display, which is a light receiving element configured to control the amount of externally applied light and display the light on a screen, requires an additional light source to irradiate a light into a liquid crystal panel. The display quality of the liquid crystal display depends on performance of a backlight unit as well as the liquid crystal panel.

The backlight unit includes a side-light type backlight and a perpendicular falling type backlight depending on location of the light source.

The perpendicular falling type backlight, which includes a plurality of fluorescent lamps arranged in a line on the rear of the liquid crystal panel, irradiates a light directly into the front surface of the liquid crystal panel. Although the perpendicular falling type backlight is suitable for a large display device and has good brightness, it is difficult to obtain the uniform brightness on the whole and the backlight has large power consumption. Moreover, the liquid crystal display becomes thicker.

The side-light type backlight, which includes a pipe shape line light source, emits a light from the line light source into the whole liquid crystal panel with a light guide plate. The side-light type backlight has lower power consumption and better light efficiency than those of the perpendicular falling type backlight.

Figure 1:
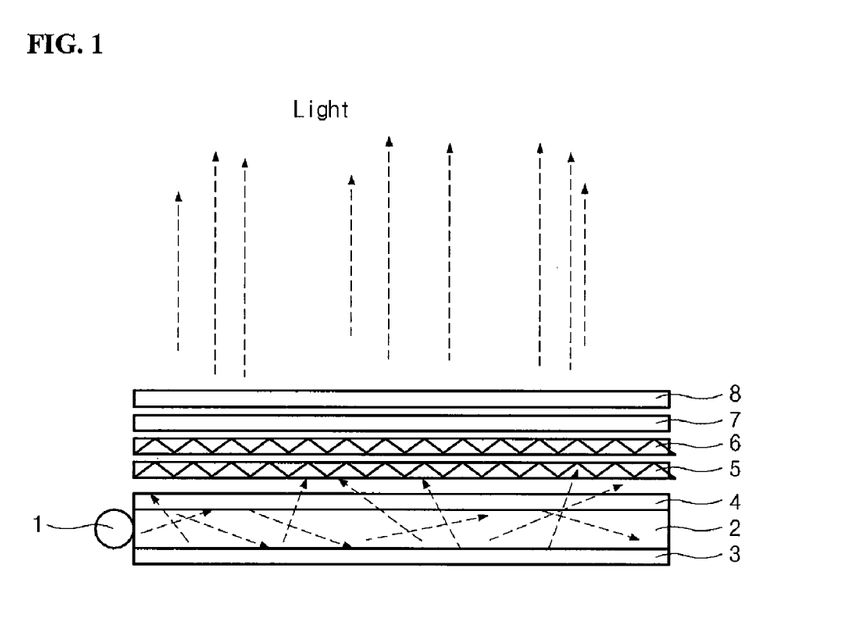
FIG. 1 is a cross-sectional diagram illustrating a general backlight unit having a side-light type.

FIG. 1 is a cross-sectional diagram illustrating a general backlight unit having a side-light type.

The general backlight unit of FIG. 1 includes a fluorescent lamp 1 configured to radiate a white light, a light guide plate 2 configured to supply the light radiated from the fluorescent lamp 1 to the front surface of a liquid crystal panel 8, a reflecting plate 3 configured to reflect a light streamed into the rear surface of the light guide plate 2, a diffusion plate 4 configured to diffuse the light supplied from the light guide plate 2 to improve the brightness of the light, prism sheets 5 and 6 configured to concentrate the light penetrated through the diffusion plate 4 to improve an angle of a field, and a protective sheet 7 configured to protect the prism sheets 5 and 6.

The light radiated from the fluorescent lamp 1 that is a light source is incident upon the light guide plate 2. The incident light is reflected or refracted on the front and back surface of the light guide plate 2, or reflected by the reflection plate 3 and emitted into the diffusion plate 4. The angle of the reflecting plate is so small that the incident light from the side cannot be reflected at 90° to its progress direction. As a result, the conventional backlight unit scattered-reflects the light using patterns formed on the surface of the reflecting plate 3. The prism sheet 5 and 6 concentrates the scattered-reflected light onto the front surface. That is, the prism sheets 5 and 6, arranged in length and width, concentrates the direction of the scattered-reflected light onto the front surface. The light concentrated by the prism sheets 5 and 6 is embodied into a screen depending on control of color signals of the liquid crystal panel 8.

When patterns are formed in the reflecting plate 3, the patterns result in loss of the light, so that the brightness of about 10% is used. Furthermore, the diffusion plate 4 and the prism sheets 5, 6 are additionally required in order to change the progress direction of the light into the front surface of the screen. As a result, the whole manufacturing cost of the display device is increased, implemental reliability is degraded, and the device is prevented from being thinner or lighter.

Of display devices, a projection television has been widely used which can embody a large screen with low cost. The projection television generates an image with an image generating unit including a small-sized cathode ray tube (CRT) or a liquid crystal display (LCD) as an image source, and magnifies and projects the image into a large screen through a projection lens.

Figure 2:
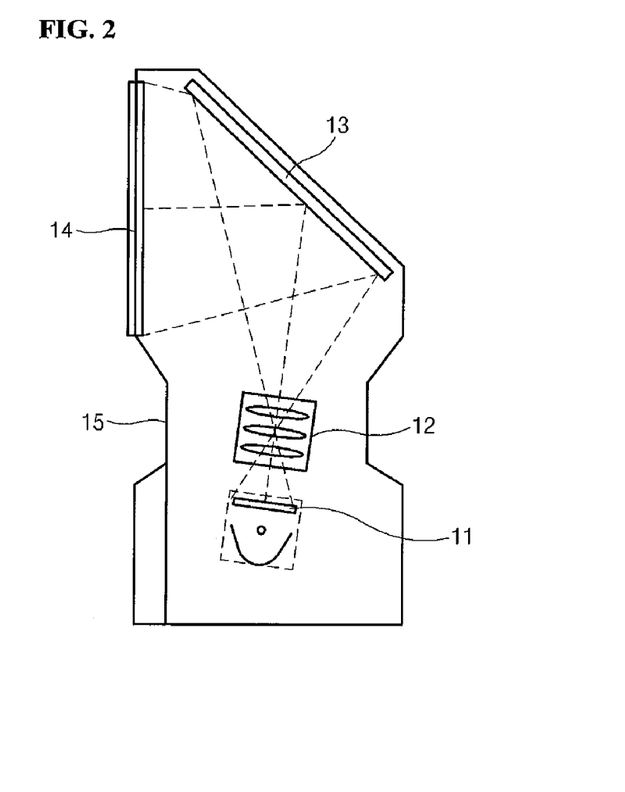
FIG. 2 is a diagram illustrating a general projection television having a backside projection type.

FIG. 2 is a diagram illustrating a general projection television having a backside projection type.

The conventional projection television having a backside projection type includes a rectangular box-type cabinet 15 where an image generating unit 11 configured to generate an image light like a cathode ray tube or a liquid crystal display and a projection lens unit 12 configured to magnify and project the image light emitted from the image generating unit 11 are built therein. A path of the image light magnified and projected by the projection lens unit 12 is changed by a reflecting mirror 13 mounted slantingly on the rear of the cabinet 15. The image light whose light path has been changed is projected into a screen 14 mounted on the front of the cabinet 15 so that an image is displayed.

The projection television is cheaper than a LCD TV or PDP TV, and facilitates embodiment of a large screen to satisfy desire of consumers who wants a large screen. However, a proper distance between the image generating unit 11 for generating an image light and the screen 14 is required so as to secure a space where the image light proceeds for magnifying the image. As a result, the projection television has become thicker and larger.

SUMMARY OF THE INVENTION

Technical Subject

Various embodiments of the present invention are directed at providing a more slimmed backlight unit and a display device with an improved reflecting structure.

Technical Solution

According to one embodiment of the present invention, a multi-reflecting device comprises at least one or more light guide plates configured to supply a light emitted from a light emitting unit to a front surface of a liquid crystal panel, and at least one or more reflecting plates formed on rear surfaces of the light guide plates respectively, each of the reflecting plates having at least one or more reflecting surfaces configured to multi-reflect a light incident upon the corresponding light guide plate from the light emitting unit and project the multi-reflected light into the front surface of the liquid crystal panel.

According to one embodiment of the present invention, a backlight unit having a multi-reflecting structure comprises at least one or more light emitting units configured to emit a light, at least one or more light guide plates, which correspond one by one to the light emitting units, configured to supply a light emitted from the corresponding light emitting unit to a front surface of a liquid crystal panel, and at least one or more reflecting plates formed on rear surfaces of the light guide plates respectively, each of the reflecting plates having at least one or more multi-reflecting surfaces configured to multi-reflect a light which is incident upon the corresponding light guide plate from the light emitting unit and project the multi-reflected light into the front surface of the liquid crystal panel.

According to one embodiment of the present invention, a display device having a multi-reflecting structure comprises an image generating unit configured to project an image light, a first double reflecting plate configured to magnify the image light from the image generating unit in a first direction and double-reflect the magnified image light to emit the light in a second direction, and a second double reflecting plate configured to magnify the image light emitted from the first double reflecting plate in the second direction and double-reflect the magnified image light to emit the light in a normal direction of a screen.

According to one embodiment of the present invention, a display device having a multi-reflecting structure comprises an image generating unit configured to project an image light, a first refraction/reflection plate configured to receive the image light emitted from the image generating unit, and refract and reflect the light to emit the light in a first direction, and a second refraction/reflection plate configured to receive the image light emitted from the first refraction/reflection plate, and refract and reflect the light to emit the light in a normal direction of a screen.

BRIEF DESCRIPTION OF THE DRAWINGS

Other aspects and advantages of the present invention will become apparent upon reading the following detailed description and upon reference to the drawings in which.

DETAILED DESCRIPTION OF THE EXEMPLARY EMBODIMENTS

The present invention will be described in detail with reference to the accompanying drawings.

Figure 3:
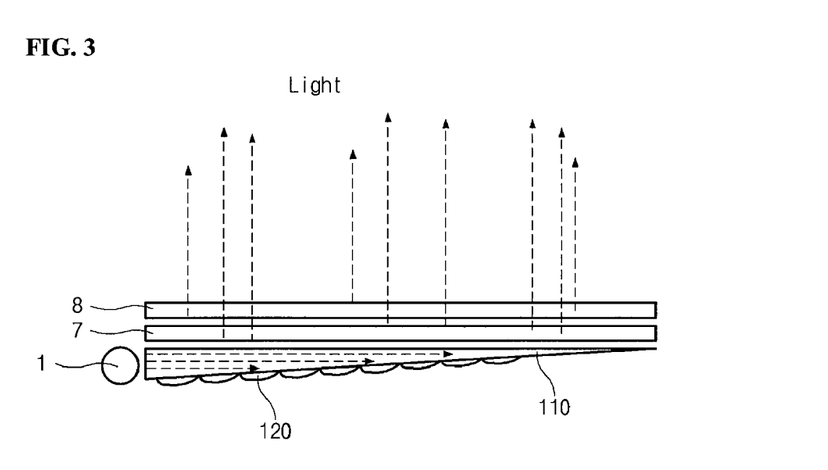
FIG. 3 is a cross-sectional diagram illustrating a first example of a backlight unit according to an embodiment of the present invention.

FIG. 3 is a cross-sectional diagram illustrating a first example of a backlight unit according to an embodiment of the present invention. The reference numbers of FIG. 3 are substantially similar to components described in reference to FIG. 1.

The backlight unit of FIG. 3 includes a fluorescent lamp 1, a light guide plate 110 (hereinafter, referred to as "LGP"), a reflecting plate 120 and a protective sheet 7.

The fluorescent lamp 1 having a pipe type which is used as a radiating unit (light source) of the backlight unit is positioned at one side of the LGP 110. The fluorescent lamp 1 is covered with a lamp cover (not shown).

The LGP 110 receives a light emitted from the fluorescent lamp 1 to supply the light into the front surface of the liquid crystal panel 8. The LGP 110 has a taper shape whose thickness becomes thinner as the distance from the light source becomes larger as shown in FIG. 3 so that a white light emitted from the fluorescent lamp 1 is evenly diffused on the whole. Specifically, the rear of the LGP 110 is formed slant at a predetermined angle.

A reflecting plate 120 having double reflecting surfaces is formed on the rear of the LGP 110. The double reflecting surfaces enable an incident light from the fluorescent lamp 1 to be bent at about 90° to its progress direction without being diffused in various directions so that the progressive direction of the incident light becomes close to a normal direction of the liquid crystal panel 8. These double reflecting surfaces are serially formed along the rear of the LGP 110 having a taper shape.

The light received from the side of the LGP 110 and magnified by the LGP 110 is double-reflected by the corresponding double reflecting surfaces depending on its incident location. That is, the double reflecting surfaces divide the light incident upon the LGP 110 depending on its incident location to first-reflect the light in an opposite direction to the front surface of the liquid crystal panel 8. Then, the double reflecting surfaces second-reflects the first-reflected light in a direction close to the normal direction of the liquid crystal panel 8.

The light incident upon the LGP 110 is not diffused in various directions but projected into the front surface of the liquid crystal panel 8. The direction of the light emitted from the LGP 110 and projected into the front surface of the liquid crystal panel 8 forms about 90° with that of the light incident upon the LGP 110 as shown in an arrow of FIG. 2.

Each of the double reflecting surfaces is formed so that the sum of an reflection angle of the first-reflected light and an reflection angle of the second-reflected light may be 90° or close to 90°.

Figure 4:
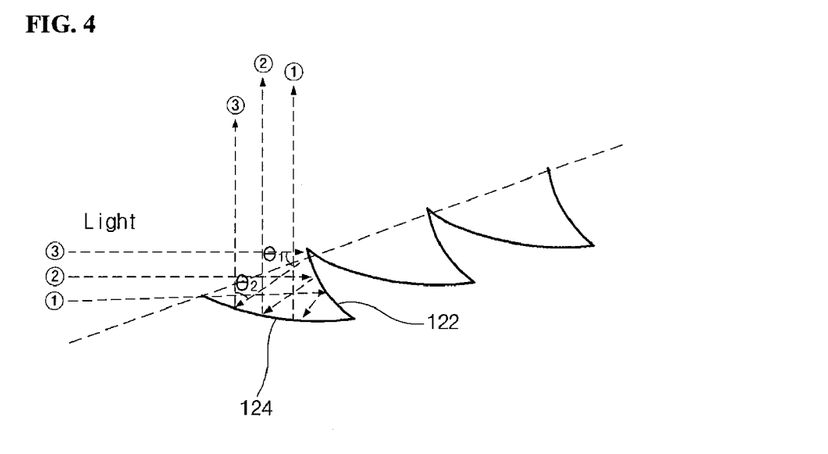
FIG. 4 is a cross-sectional diagram illustrating an example of a double reflecting surface according to an embodiment of the present invention.

FIG. 4 is a cross-sectional diagram illustrating an example of the double reflecting surface according to an embodiment of the present invention.

Each of the double reflecting surfaces includes a first reflecting surface 122 configured to first-reflect the light incident upon the LGP 110 from the fluorescent lamp 1 in an opposite (not directly) direction of the liquid crystal panel 8 and a second reflecting surface 124 configured to reflect the light reflected from the first reflecting surface 122 toward the front surface of a liquid crystal panel 8 close to the normal direction of the liquid crystal panel 8.

The first reflecting surface 122 has a convex oval shape to the incident light, and the second reflecting surface 124 has a concave oval shape to the incident light. The order of the light incident upon the LGP 110 from the fluorescent lamp 1 is reversed by the double reflecting surface. That is, as shown in FIG. 4, the light incident upon the LGP 110 in order (1), (2), (3) from the bottom is reversed into order (3), (2), (1) from the left by the first double reflecting surface, and then projected into the protective sheet 7 and the liquid crystal panel 8.

Figure 5:
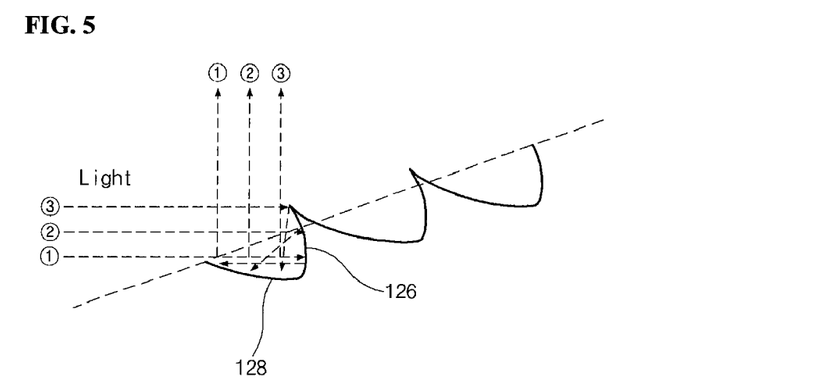
FIG. 5 is a cross-sectional diagram illustrating another example of a double reflecting surface according to an embodiment of the present invention.

FIG. 5 is a cross-sectional diagram illustrating another example of a double reflecting surface according to an embodiment of the present invention.

Each of the double reflecting surfaces of FIG. 5 includes a first reflecting surface 126 different from the first reflecting surface 122 of FIG. 4. That is, the first reflecting surface 126 has a concave oval shape to the incident light. As a result, in FIG. 5, the order of the light incident upon the LGP 110 from the fluorescent lamp 1 is the same as that of the light reflected from the reflecting plate 120 unlike in FIG. 4.

The light incident upon the LGP 110 in order (1), (2), (3) from the bottom as shown in FIG. 5 is double-reflected in the first double reflecting surface, and projected into the protective sheet 7 and the crystal liquid panel 8 in order (1), (2), (3) from the left.

Although the first reflecting surfaces 122 and 126 of FIGS. 4 and 5 have a curved surface with convex and concave shape respectively, the present invention is not limited in these examples.

In other words, the double reflecting surface according to the embodiment of the present invention is characterized in that the path of the light incident upon the LGP 110 is changed so that the light may be projected in a predetermined direction without being diffused in various directions. Only if the sum of a reflective angle ($\theta_1$) of the first reflecting surfaces 122 and 126 and a reflective angle ($\theta_2$) of the second reflecting surfaces 124 and 128 is 90° or close to 90°, shapes of the first reflecting surfaces 122, 126 and the second reflecting surfaces 124, 128 do not matter.

Hereinafter, the operation of the above-described backlight unit according to the embodiment of the present invention is explained.

The light emitted from the fluorescent lamp 1 is incident upon the LGP 110. The LGP 110 has a taper shape whose thickness becomes thinner as the distance from a light source becomes larger so that the light from the light source may be evenly diffused in the LGP 110 on the whole. The light incident upon the LGP 110 having a taper shape is reflected at a predetermined angle ($\theta_1$) in the first reflecting surface 122 of the corresponding double reflecting surface depending on its incident location, and projected into the second reflecting surface 124. The second reflecting surface 124 reflects the light reflected in the first reflecting surface 122 at a predetermined angle ($\theta_2$) to progress the light in the normal direction of the liquid crystal panel 8 or its close direction.

The double-reflected light by the first reflecting surface 122 and the second reflecting surface 124 is penetrated through the LGP 110 and the protective sheet 7, and projected into the liquid crystal panel 8.

Figure 6:
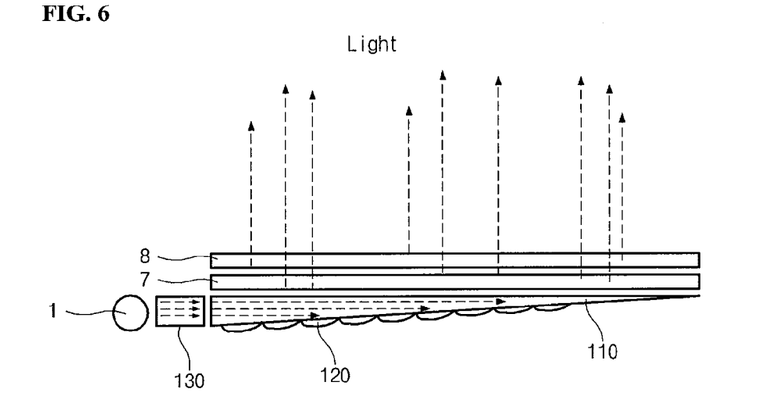
FIG. 6 is a cross-sectional diagram illustrating a second example of a backlight unit according to an embodiment of the present invention.

FIG. 6 is a cross-sectional diagram illustrating a second example of a backlight unit according to an embodiment of the present invention.

The backlight unit of FIG. 3 is more effective when the light incident upon the LGP 110 is a collimated light. As a result, the backlight unit of FIG. 6 further includes a light guide 130 configured to make the light emitted from the fluorescent lamp 1 as a collimated light between the fluorescent lamp 1 and the LGP 110 to emit the collimated light into the LGP 110.

Figure 7:
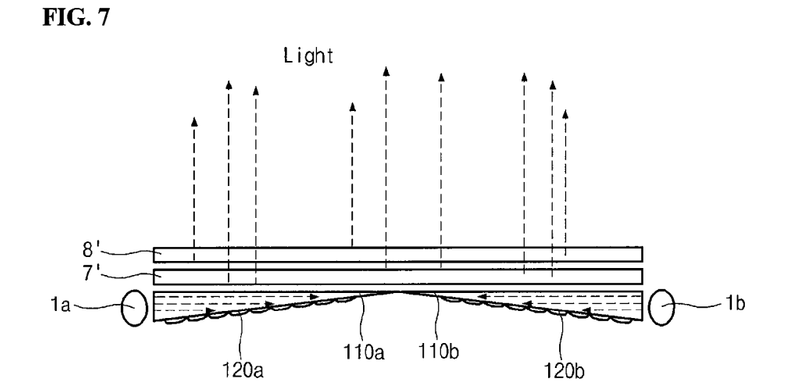
FIG. 7 is a cross-sectional diagram illustrating a third example of a backlight unit according to an embodiment of the present invention.

FIG. 7 is a cross-sectional diagram illustrating a third example of a backlight unit according to an embodiment of the present invention.

The backlight unit of FIG. 7 includes a plurality of the backlight units of FIG. 3 so that it can be applied to a liquid crystal device having a large screen.

As shown in FIG. 7, the edges (opposite side of the light source) of the LGPs 110a and 110b where a reflecting plate having double reflecting surfaces is formed with the same structure are closely adhered to each other so that their top surfaces are located on the same surface. A protective sheet 7', which is large enough to cover the whole top surfaces of the LGPs 110a and 110b, is formed over the top surface of the LGPs 110a and 110b. The number of combined LGPs can be adjustable depending on the size of liquid crystal panel 8'.

In this way, the backlight units according to the embodiment of the present invention are connected with each other so that it is possible to manufacture a large backlight unit which can be applied to a large-scaled liquid crystal display. As a result the liquid crystal display can be thinner and lighter to reduce manufacturing cost.

In the above-described embodiments, in order to broaden the reflective angle coating can be performed or patterns can be formed over the first reflecting surfaces 122 126 and the second reflecting surfaces 124 and 128, which may result in scattered reflection. In this case, a diffusion plate 4 is further positioned over the emitting surface of the LGP 110, that is, between the protective sheets 7 or 7' and the LGP 110 to increase the reflective angle of the light.

Although the above-described embodiment shows only a case the light is double reflected before the light incident upon the LGP 110 is emitted into the liquid crystal panel with the double reflecting surface, the light can be reflected triple, quadruple, etc. and emitted into the liquid crystal panels 8 and 8'.

Figure 8:
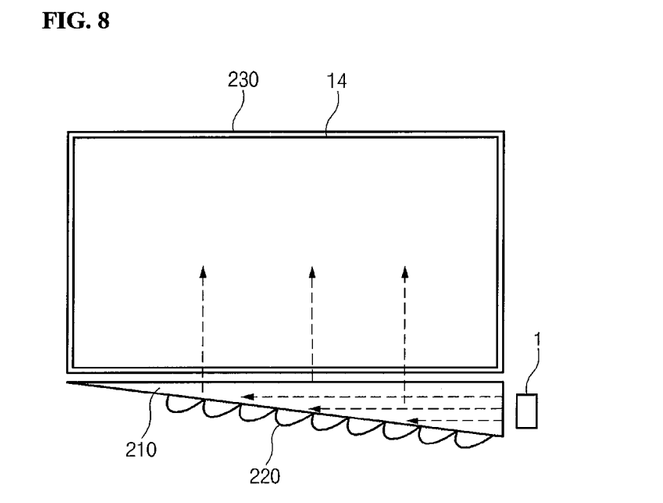
FIGS. 8 and 9 are diagrams illustrating a first example of a projection television having a reflecting structure according to an embodiment of the present invention.
Figure 9:
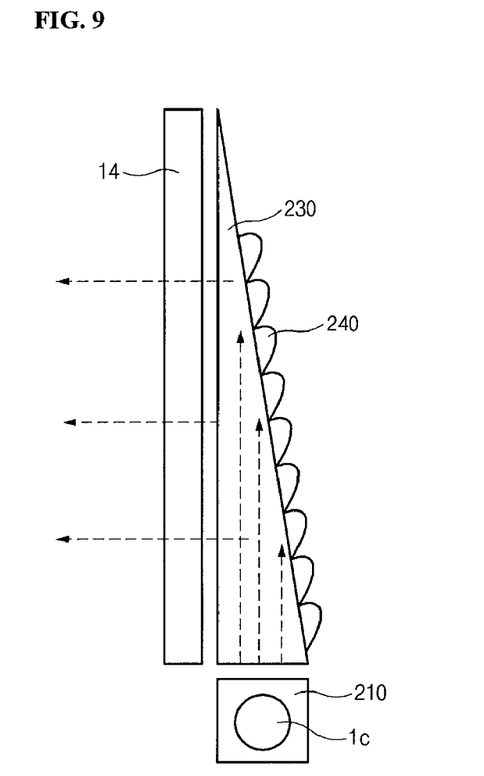

FIGS. 8 and 9 are diagrams illustrating a first example of a projection television having a reflecting structure according to an embodiment of the present invention.

In this embodiment, the projection television includes two reflecting plate (hereinafter, referred to as "double reflecting plate) having double reflecting surfaces uses in the above-described backlight unit to form a light path of an image light. That is, the projection television in this embodiment has a magnifying projection structure configured to magnify the image light in X-axis and Y-axis directions with the two double reflecting plates.

The projection television in this embodiment includes an image generating unit 1c, a first LGP 210, a first reflecting plate 220, a second LGP 230, a second reflecting plate 240 and a screen 14. The image generating unit 1c and the screen 14 are substantially similar to the corresponding components described in reference to FIG. 2.

The first LGP 210 magnifies the image light received from the image generating unit 1c formed at one side of the first LGP 210 in the X-axis direction (horizontal direction of FIGS. 8 and 9) of the screen 14, and projects the image light into one side of the second LGP 230. The LGP 210 has a taper shape whose thickness becomes thinner as the distance from the image generating unit 1c becomes larger. The front surface (hereinafter, referred to as the surface where a light is emitted from each LGP) of the first LGP 210 close to the second LGP 230 is configured to be in parallel with the second LGP 230. The rear surface (hereinafter, referred to the opposite side to the direction where a light is emitted from each LGP) of the first LGP 210 is formed slant at a predetermined angle.

The image generating unit 1c, which is positioned at one side of the first LGP 210, projects an image light into the first LGP 210. The image light incident upon the first LGP 210 is magnified corresponding to the width of the screen 14 (the horizontal (X) axis length of the screen) by characteristics of the LGP 210.

The first reflecting plate 220, which is formed on the rear surface of the first LGP 210, double-reflects the image light incident upon the side surface of the first LGP 210 to progress the image light perpendicular to the second LGP 230 as shown in an arrow of FIG. 8. The first reflecting plate 220 includes a plurality of double reflecting surfaces formed serially along the rear surface of the first LGP 210 having a taper shape. The function and principle of the double reflecting surface are substantially the same as those of FIG. 5. Thus, the image light is magnified in the X-axis direction by the first LGP 210, and projected into the second LGP 230.

The second LGP 230 is formed with a predetermined interval apart from the rear side of the screen 14. The second LGP 230 magnifies the image light received from the first LGP 210 in the Y-axis direction (vertical direction of FIGS. 8 and 9) of the screen 14. The function and principle of the second LGP 230 are substantially similar to those of the first LGP 210 except the direction for magnifying the image light and its size (length and width). The image light magnified in the X-axis direction by the first LGP 210 is re-magnified in the Y-axis direction by the second LGP 230 as shown in an arrow of FIG. 9.

The second reflecting plate 240, which is formed on the rear surface of the second LGP 230, double reflects the image light incident upon the side surface of the second LGP 230. The image light received in parallel from the first LGP 210 as shown in the arrow of FIG. 9 is bent at about 90°, and vertically projected into the front surface of the screen 14. Also, the second reflecting plate 240 is substantially similar to the first reflecting plate 220 except the size.

Figure 10:
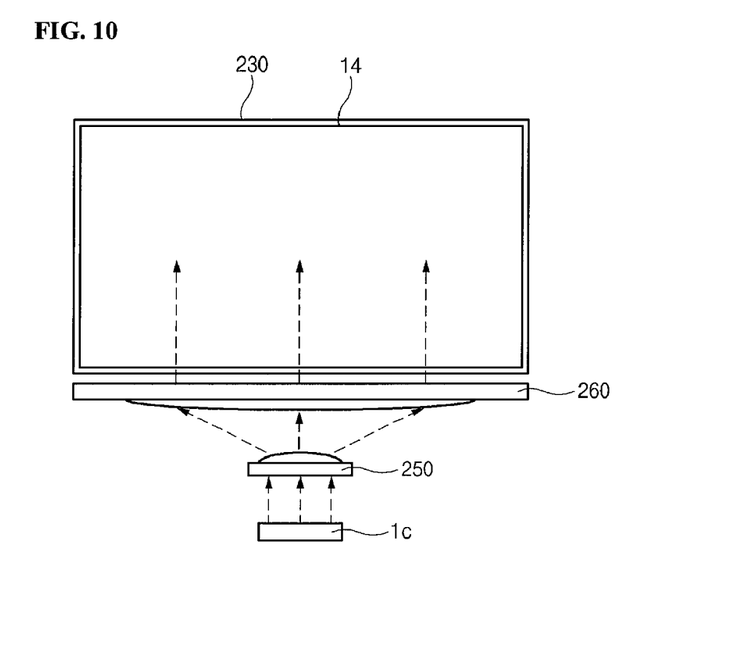
FIG. 10 is a diagram illustrating a second example of a projection television according to an embodiment of the present invention.

FIG. 10 is a diagram illustrating a second example of a projection television according to an embodiment of the present invention.

In this embodiment, one double reflecting plate 230, a diffusion lens 250 and a collimate lens 260 are used.

In comparison with the example of FIGS. 8 and 9, the projection television of FIG. 10 is different from that of FIGS. 8 and 9 in a unit for magnifying an image light in the X-axis direction while both examples include the second LGP 230 and the second reflecting plate 240 for magnifying an image light in the Y-axis direction. That is, the image light is magnified in the Y-axis direction by the second LGP 230 and the second reflecting plate 240 as shown in FIG. 9 while it is magnified in the X-axis direction by the diffusion lens 250 and the collimate lens 260.

As a result, in this embodiment, the image generating unit 1c, the diffusion lens 250 and the collimate lens 260 are arranged serially toward the bottom of the screen 14 as shown in FIG. 10.

The image light projected in parallel from the image generating unit 1c is diffused in the X-axis direction by the diffusion lens 250, and projected into the collimate lens 260. The image light diffused in the X-axis direction is converted into a collimated light by the collimate lens 260, and projected into one side of the second LGP 230. Then, the diffusion in the Y-axis direction is substantially the same as that of FIGS. 8 and 9.

In the above-described embodiment, the image light is first magnified in the X-axis direction and then in the Y-axis direction, and projected into the screen 14. However, the order can be changed.

Figure 11:
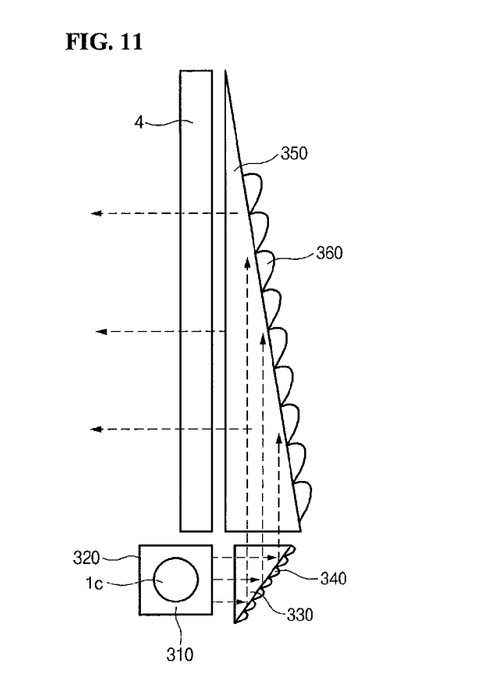
FIG. 11 is a diagram illustrating a third example of a projection television having a reflecting structure according to an embodiment of the present invention.

FIG. 11 is a diagram illustrating a third example of a projection television having a reflecting structure according to an embodiment of the present invention.

In this embodiment, the projection television includes three double reflecting plates, that is, three LGPs and three reflecting plates positioned on the rear surfaces of the three LGPs respectively.

The projection television of FIG. 11 includes an image generating unit 1c, third through fifth LGPs 310, 330, 350, and third through fifth reflecting plates 320, 340, 360.

The third LGP 310 magnifies image light received from the image generating unit 1c in the X-axis direction of the screen 14 to project the light into one side of the fourth LGP 330. Although the third LGP 310 is substantially similar to the first LGP 210, the emission direction of the image light is different. That is, while the first LGP 210 emits the magnified light in the Y-axis direction (upward) of the screen 14, the third LGP 310 emits the light in a back direction (Z-axis direction) of the screen 14.

The third reflecting plate 320, which is formed on the rear (left side of FIG. 11) of the third LGP 310, double reflects the image light incident upon the third LGP 310 and magnified in the X-axis direction of the screen 14 to be emitted in the Z-axis direction of the screen 14, that is, toward the fourth LGP 330.

The fourth LGP 330 magnifies the image light emitted from the third LGP 310 in the Z-axis direction of the screen 14, and emits the magnified image light into the fifth LGP 350. The fourth reflecting plate 340, which is formed on the rear of the fourth LGP 330, double reflects the image light magnified in the Z-axis direction in the fourth LGP 330 toward the Y-axis direction of the screen 14, that is, toward the fifth LGP 350.

The fifth LGP 350, which is formed with a predetermined interval apart from the rear side of the screen 14, magnifies the image light received from the fourth LGP 330 in the Y-axis direction of the screen 14, and projects the image light into the screen 14.

The fifth reflecting plate 360, which is formed on the rear surface of the fifth LGP 350, double reflects the image light received from the fourth LGP 330 toward the screen 14.

The structure and functional principle of the third through the fifth reflecting plates 320, 340, 360 are substantially the same as those of the first and the second reflecting plates 220 and 240.

Figure 12:
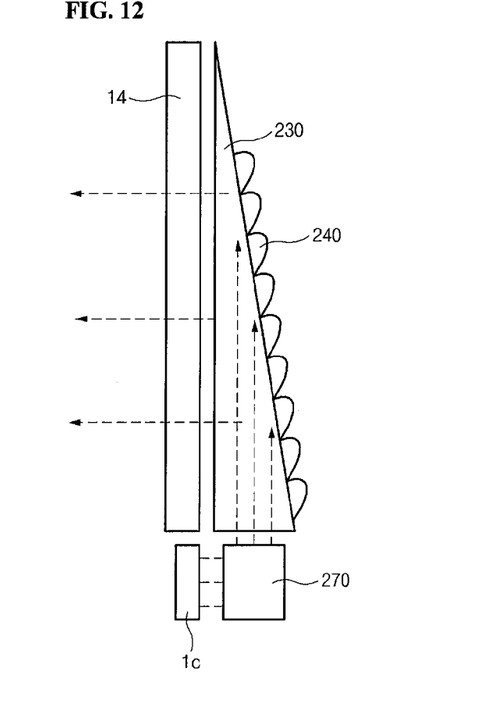
FIGS. 12 and 13 are diagrams illustrating a fourth example of a projection television according to an embodiment of the present invention.
Figure 13:
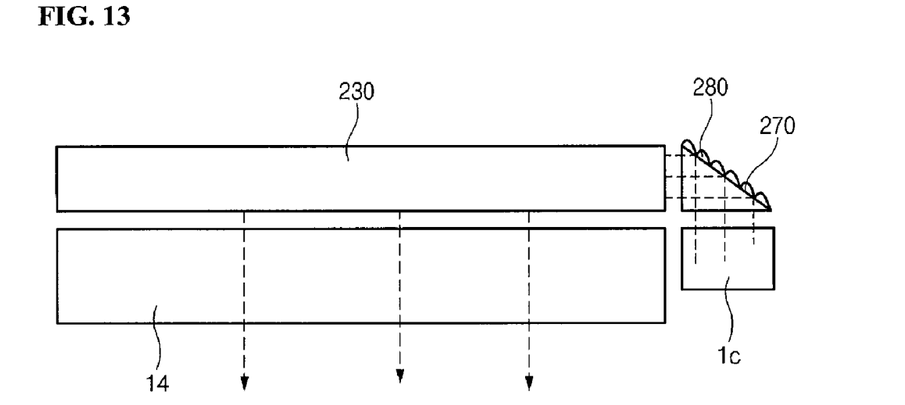

FIGS. 12 and 13 are diagrams illustrating a fourth example of a projection television according to an embodiment of the present invention. FIG. 12 shows the side view of the projection television, and FIG. 13 shows the top view of the projection television.

In comparison with FIGS. 8 and 9, the image generating unit 1c is moved into the right bottom of the screen 14, and the image light emitting surface is rotated clockwise at 90° so that the image light may be emitted in the back direction (Z-axis direction) of the screen 14. That is, while the image generating unit 1c emits the image light in the X-axis direction in FIG. 8, the image generating unit 1c emits the image light in the Z-axis direction (backward of the screen) in FIGS. 12 and 13. In the original location of the image generating unit 1c, there are a LGP 270 and a reflecting plate 280 for reflecting the image light emitted from the image generating unit 1c into the first LGP 210 (not shown by the LGPs 270 and 230 in FIG. 11). That is, the image light emitted from the image generating unit 1c is magnified and double-reflected by the LGP 270 and the reflecting plate 280, and its progress direction is bent at 90° to be emitted into the first LGP 210.

The structure and functional principle of the LGP 270 and the reflecting plate 280 are substantially the same as those of the above-described LGP and reflecting plate.

Thereafter, the image light magnified and double-reflected by the LGP 270 and the reflecting plate 280 is magnified and double-reflected sequentially by the first LGP 210, the first reflecting plate 220, the second LGP 230 and the second reflecting plate 240 as shown in FIG. 8, and then projected into the screen 4.

Figure 14:
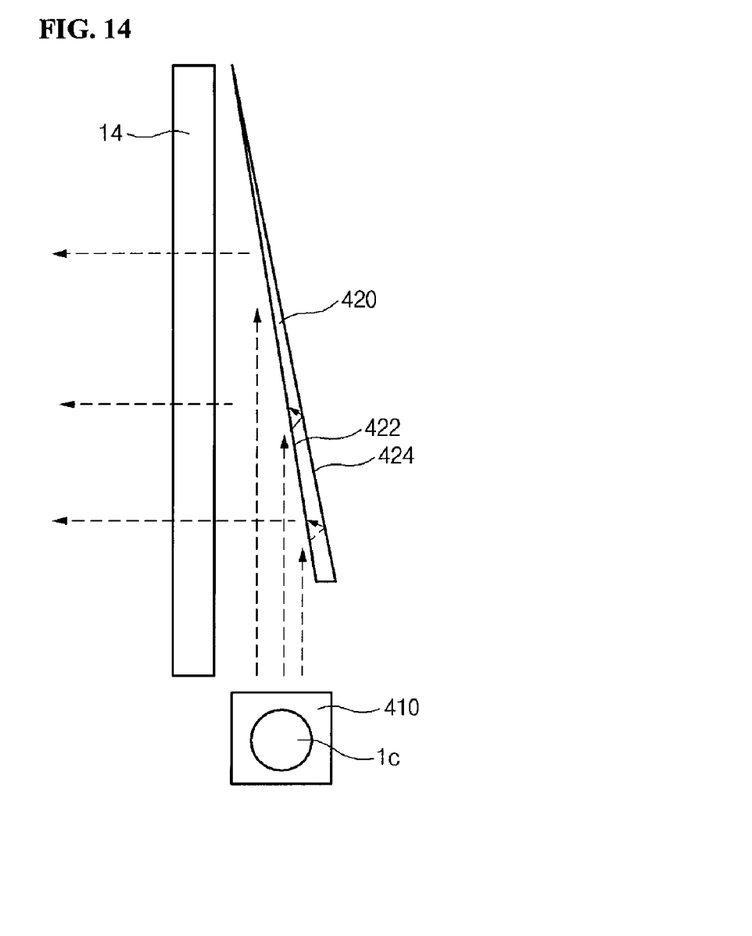
FIGS. 14 and 15 are diagrams illustrating a fifth example of a projection television according to an embodiment of the present invention.
Figure 15:
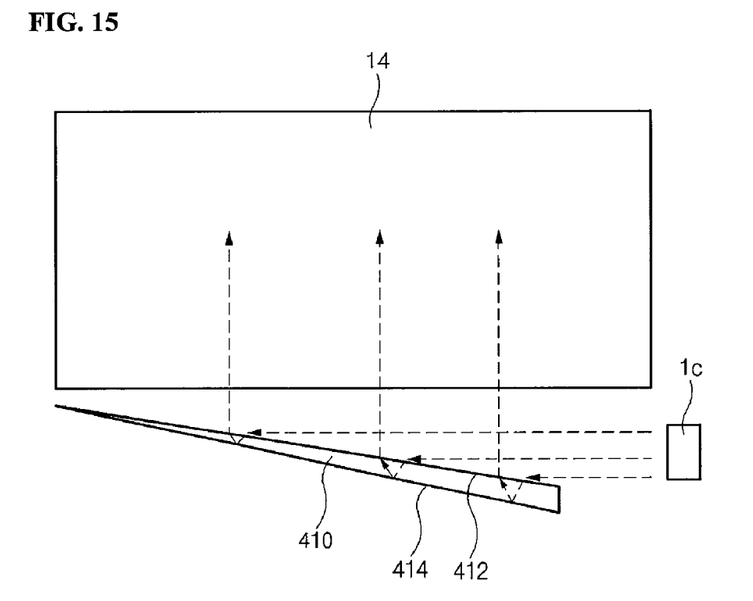

FIGS. 14 and 15 are diagrams illustrating a fifth example of a projection television according to an embodiment of the present invention. FIG. 14 shows a magnifying projection structure in the X-axis direction, and FIG. 15 shows a magnifying projection structure in the Y-axis direction.

In this embodiment, the projection television includes an image generating unit 1c, a first refraction/reflection plate 410 and a second refraction/reflection plate 420.

The first refraction/reflection plate 410 as a medium with a predetermined refractive index has a taper shape whose thickness is changed with a predetermined angle. The first refraction/reflection plate 410 has a refractive surface 412 configured to be penetrated by an image light projected from the image generating unit 1c, and a reflecting surface 414 configured to regularly reflect the image light refracted in the refractive surface 412.

The first refraction/reflection plate 410 refracts and reflects the image light received in parallel from the image generating unit 1c to progress the image light into the second refraction/reflection plate 420 while the light is bent at 90° to the incident direction. That is, the image light emitted from the image generating unit 1c passes through air, and it is incident upon the first refraction/reflection plate 410 through the refractive surface 412. Since the refractive index (c) of the first refraction/reflection plate 410 is different from the refractive index ("1") of the air, the incident image light is refracted at a predetermined angle in the refractive surface 412 depending on the refractive index (c) of the first refraction/reflection plate 410, and progresses toward the reflecting surface 414.

The image light refracted in the refractive surface 412 is regularly reflected in the reflecting surface 414, and refracted in the refractive surface 412 again to progress into the second refraction/reflection plate 420. Due to this refraction and reflection effect, the progress direction of the image light emitted into the second refraction/reflection plate 420 is bent at 90° to the progress direction of the image light incident upon the first refraction/reflection plate 410. Also, the image light is magnified in the X-axis direction of the screen 14 when the image light is refracted in the first refraction/reflection plate 410. As a result, the first refraction/reflection plate 410 has a function of magnifying an image. The refraction/reflection plate 410 includes a permeable medium such as glass, acryl and diamond.

The second refraction/reflection plate 420 has a substantially similar structure with the first refraction/reflection plate 410. As a result, refraction and reflection of the second refraction/reflection plate 420 are performed by the same principle as that of the first refraction/reflection plate 410.

The second refraction/reflection plate 420 refracts and reflects the image light which is refracted and reflected in the first refraction/reflection plate 410 and then bent at 90°, and then progresses the light in the normal direction (Z-axis direction) of the screen 14. That is, the second refraction/reflection plate 420 magnifies the image light magnified in the X-axis direction by the first refraction/reflection plate 410 in the Y-axis direction, and projects the image light into the screen 14. In this way, the image light emitted from the image generating unit 1c is magnified sequentially in the X-axis and Y-axis directions by the first refraction/reflection plate 410 and the second refraction/reflection plate 420, so that the image light emitted from the image generating unit 1c is largely magnified on the whole to be displayed through the screen 14.

Figure 16:
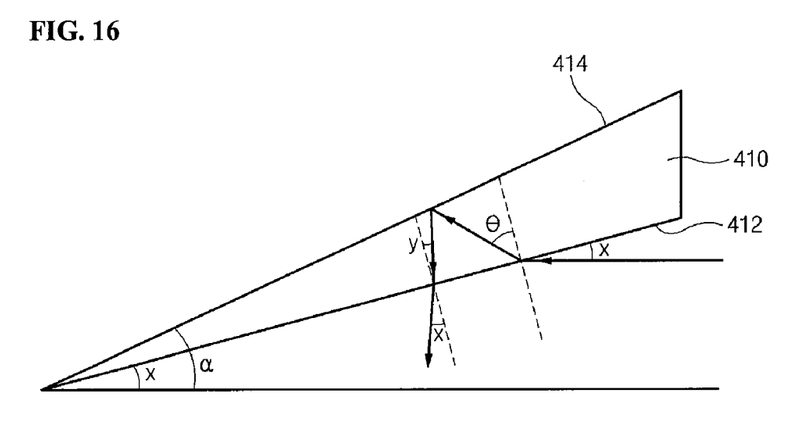
FIG. 16 is a diagram illustrating a light refracted and reflected in a refraction/reflection plate of FIGS. 14 and 15.

FIG. 16 is a diagram illustrating a light refracted and reflected in the refraction/reflection plate of FIGS. 14 and 15.

After the image light from the image generating unit 1c passes through the air and then is incident upon the refractive surface 412 of the first refraction/reflection plate 410, the image light is bent at a predetermined angle toward the reflecting surface 414 while penetrating the refractive surface 412 because the refractive index (c) of the first refraction/reflection plate 410 is different from that of the air. Suppose that $\chi$ is an angle (incident angle) between the incident image light and the refractive surface 412 of the first refraction/reflection plate 410, and $\theta$ is an angle (refractive angle) between the normal line of the refractive surface 412 and the image light refracted in the refractive surface 412. The incident angle $\chi$ and the refractive angle $\theta$ satisfy Equation 1.

$$\frac{\sin(\frac{\pi}{2} - \chi)}{\sin\theta} = \frac{\cos\chi}{\sin\theta} = c \quad \text{[Equation 1]}$$

The image light bent at $\theta$ in the refractive surface 412 is regularly reflected at the same angle in the reflecting surface 414, and progresses toward the refractive surface 412. The image light reflected in the reflecting surface 414 is refracted in the refractive surface 412, and emitted in a perpendicular falling direction. Suppose that y is an angle between the image light reflected in the reflecting surface 414 of the first refraction reflecting plate 410 and the normal line of the refractive surface 412 and $\alpha$ is an angle between the image light received from the image generating unit 1c and the reflecting surface 414. The angles $\chi$ and y, and the refractive index c satisfy Equation 2.

$$\frac{\sin y}{\sin x} = \frac{\sin(2x - 2\alpha + \theta)}{\sin x} = \frac{1}{c} \quad \text{[Equation 2]}$$

From Equations 1 and 2, a condition can be obtained so that the image light incident upon the refraction/reflection plate 410 is refracted and reflected in the refraction/reflection plate 410 and then emitted with its progress direction bent at 90° or close to 90°.

In other words, the relationship between χ and α can be understood so that the refractive angle when the image light is reflected in the reflecting surface 414 and penetrates the refractive surface 412 may be the same as the incident angle χ.

Figure 17:
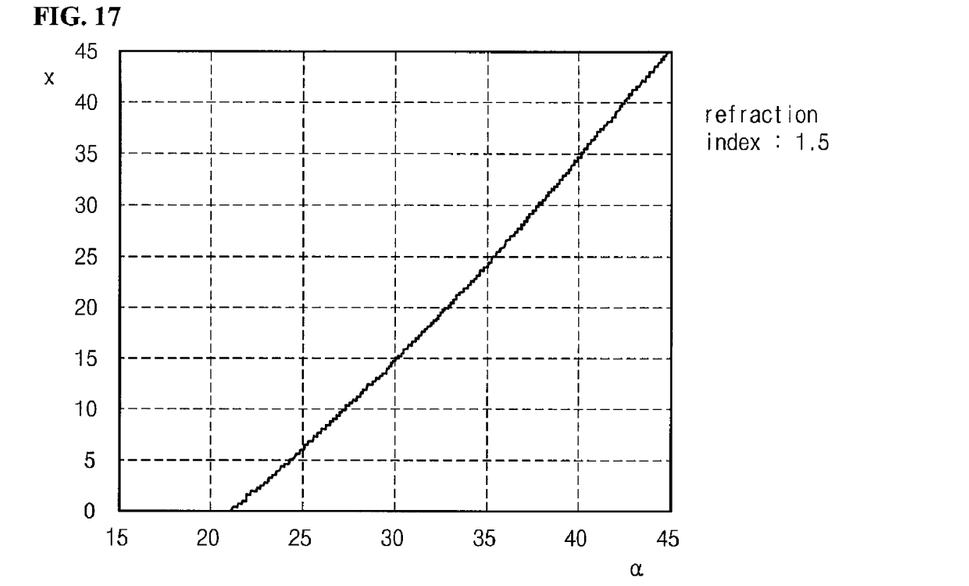
FIG. 17 is a diagram illustrating a relationship between an incident angle($\chi$) of an image light and a location angle ($\alpha$) of a refraction/reflection plate when a medium having a refractive index of 1.5 is used as the refraction/reflection plate.

FIG. 17 is a diagram illustrating the relationship between the incident angle χ and the α when a medium having the refractive index c of 1.5 is used as the refraction/reflection plate.

Although the first refraction/reflection plate 410 is only explained in the above-described embodiment, the second refraction/reflection plate 420 is substantially the same as the first refraction/reflection plate 410.

Figure 18:
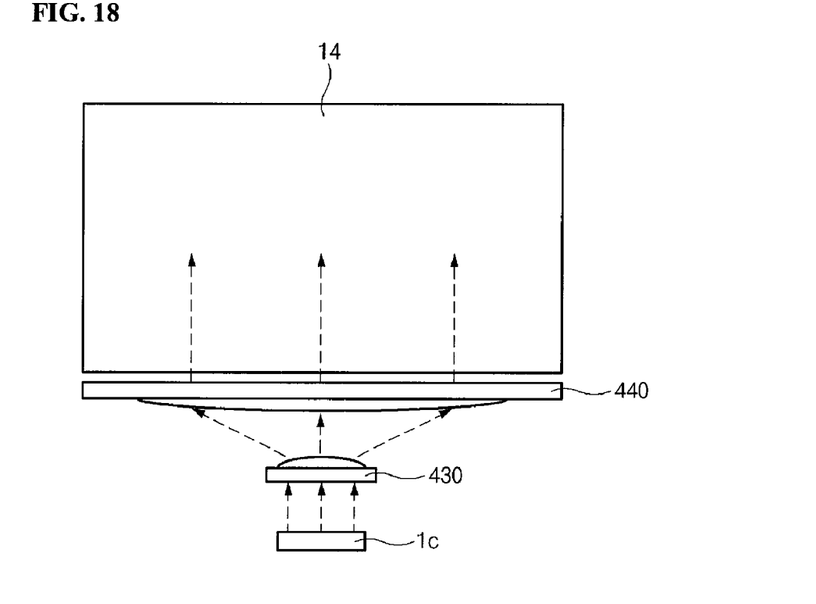
FIG. 18 is a diagram illustrating a sixth example of a projection television according to an embodiment of the present invention.

FIG. 18 is a diagram illustrating a sixth example of a projection television according to an embodiment of the present invention.

In this embodiment, a diffusion lens 430 and a collimate lens 440 are used instead of the first refraction/reflection plate 410 in comparison with FIG. 12.

The diffusion lens 430 magnifies the image light from the image generating unit 1c in the X-axis direction of the screen 14. The collimate lens 440 converts the image light diffused in the X-axis direction by the diffusion lens 430 into a collimated light to emit the light into the second refraction/reflection plate 420. That is, the image generating unit 1c, the diffusion lens 430 and the collimate lens 440 are arranged serially in the bottom of the second refraction/reflection plate 420. The image light from the image generating unit 1c is first magnified in the X-axis direction with lens 430 and 440, and then emitted into the second refraction/reflection plate 420.

Figure 19:
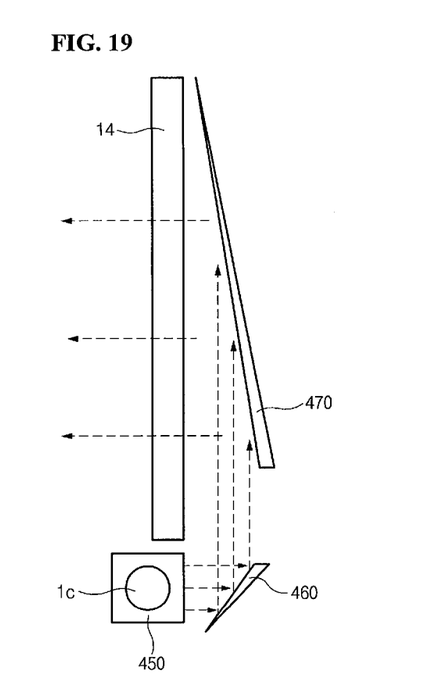
FIG. 19 is a diagram illustrating a seventh example of a projection television according to an embodiment of the present invention.

FIG. 19 is a diagram illustrating a seventh example of a projection television according to an embodiment of the present invention.

In this embodiment, the projection television includes an image generating unit 1c, and third through fifth refraction/reflection plates 450, 460 and 470. That is, three refraction/reflection plates 450, 460 and 470 are used in the projection television of FIG. 19.

The third refraction/reflection plate 450 refracts and reflects an image light received from the image generating unit 1c to magnify the image in the X-axis direction, and bends its progress direction at 90° to progress the light toward the fourth refraction/reflection plate 460. That is, the third refraction/reflection plate 450 emits the image light incident toward the X-axis direction of the screen 14 in the Z-axis direction (backward) of the screen 14.

The fourth refraction/reflection plate 460 refracts and reflects the image light refracted and reflected by the third refraction/reflection plate 450, and emits the light into the fifth refraction/reflection plate 470. That is, the fourth refraction/reflection plate 460 emits the image light incident toward the Z-axis direction of the screen 14 in the Y-axis direction of the screen 14. The image light is magnified in the Z-axis direction of the screen 14 by refraction in the fourth refraction/reflection plate 460.

The fifth refraction/reflection plate 470, which is formed apart from a predetermined distance in the rear side of the screen 14, refracts and reflects the image light received from the fourth refraction/reflection plate 460 to emit the light in the normal direction (Z-axis direction) of the screen 14 toward the screen 14. The image light is magnified in the Y-axis direction of the screen 14 through the refraction of the fifth refraction/reflection plate 470.

The structure and functional principle of the above-described third through fifth refraction/reflection plates 450, 460 and 470 are substantially the same as those of the first and the second refraction/reflection plates 410 and 420.

Figure 20:
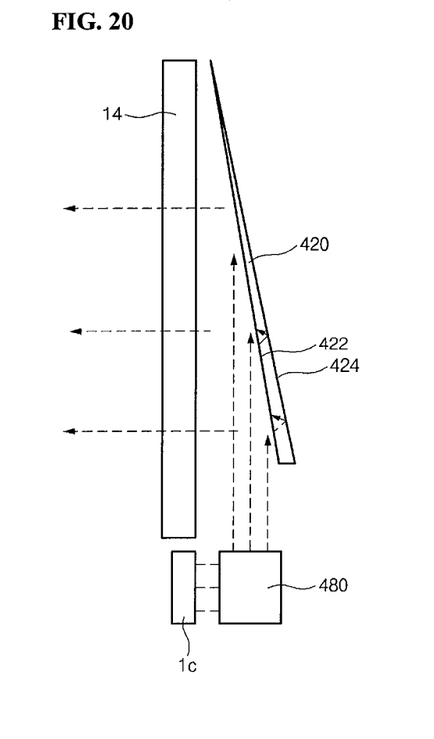
FIGS. 20 and 21 are diagrams illustrating an eighth example of a projection television according to an embodiment of the present invention.
Figure 21:
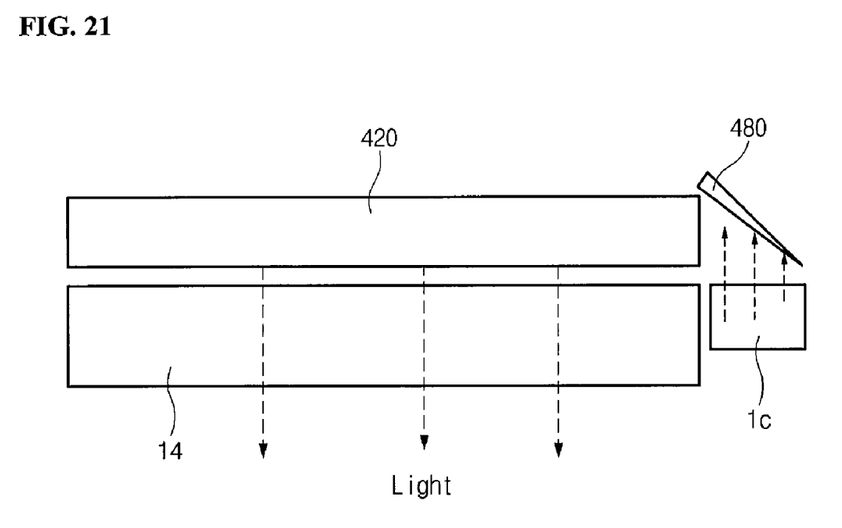

FIGS. 20 and 21 are diagrams illustrating an eighth example of a projection television according to an embodiment of the present invention. FIG. 20 shows the side view of the projection television, and FIG. 21 shows the top view of the projection television.

This embodiment shows another example when three refraction/reflection plates are used.

In comparison with the example of FIGS. 14 and 15, the image generating unit 1c is moved into the right bottom of the screen 14, and the image light emitting surface is rotated clockwise at 90° so that the image light may be emitted in the back direction (Z-axis direction) of the screen 14. That is, while the image generating unit 1c emits the image light in the X-axis direction in FIGS. 14 and 15, the image generating unit 1c emits the image light in the Z-axis direction (backward of the screen) in FIGS. 20 and 21. In the original location of the image generating unit 1c, a sixth refraction/reflection plate 480 for refracting and reflecting the image light emitted from the image generating unit 1c to emit the light into the first refraction/reflection plate 410 is positioned. That is, the image light emitted from the image generating unit 1c is refracted and reflected in the sixth refraction/reflection plate 480, and its progress direction is bent at 90° to be emitted into the first refraction/reflection plate 410.

In FIGS. 20 and 21, the first refraction/reflection plate 410 is not shown by other refraction/reflection plates 420 and 480.

The refraction/reflection plates used in the projection television in the above-described embodiment may be formed of the same medium or different mediums depending on design of a user.

Accordingly, a light is magnified and reflected with a multi-reflecting structure according to an embodiment of the present invention to be emitted in a desired direction so that a backlight unit and a display device can be slimmer.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A multi-reflecting device comprising:
   at least one or more light guide plates configured to supply a light emitted from a light emitting unit to a front surface of a liquid crystal panel; and
   at least one or more reflecting plates formed on rear surfaces of the light guide plates respectively, each of the reflecting plates having at least one or more reflecting surface configured to multi-reflect a light incident upon the corresponding light guide plates from the light emitting unit and project the multi-reflected light into the front surface of the liquid crystal panel,
   wherein the multi-reflecting surface comprises:
      a first reflecting surface configured to first reflect a light, which is incident upon the light guide plate from the light emitting unit, in a direction opposite to the liquid crystal panel; and a second reflecting surface configured to second reflect the light reflected from the first reflecting surface into the liquid crystal panel.

2. The multi-reflecting device according to claim 1, further comprising at least one or more light guides positioned between the light emitting unit and the light guide plate and configured to make a light emitted from the light emitting unit into a collimated light to emit the collimated light into the light guide plate.

3. The multi-reflecting device according to claim 1 or 2, wherein the light guide plate is formed to have a taper shape whose thickness becomes thinner as a distance from the light emitting unit becomes larger.

4. The multi-reflecting device according to claim 3, wherein the first reflecting surface and the second reflecting surface are subjected to coating or have patterns.

5. The multi-reflecting device according to claim 4, further comprising a diffusion plate configured to diffuse a light from the light guide plate on an emission surface of the light guide plate.

6. A backlight unit having a multi-reflecting structure, the unit comprising:
at least one or more light emitting units configured to emit a light;
at least one or more light guide plates, corresponding one by one to the light emitting units, configured to supply a light emitted from the corresponding light emitting unit to a front surface of a liquid crystal panel; and
at least one or more reflecting plates formed on rear surfaces of the light guide plates respectively, each of the reflecting plates having at least one or more multi-reflecting surfaces configured to multi-reflect a light which is incident upon the corresponding light guide plate from the light emitting unit and project the multi-reflected light into the front surface of the liquid crystal panel,
wherein the multi-reflecting surface comprises:
a first reflecting surface configured to first reflect a light, which is incident upon the light guide plate from the light emitting unit, in a direction opposite to the liquid crystal panel; and
a second reflecting surface configured to second reflect the light reflected from the first reflecting surface into the liquid crystal panel.

7. The backlight unit according to claim 6, further comprising at least one or more light guides positioned between the light emitting unit and the light guide plate and configured to make a light emitted from the light emitting unit into a collimated light to emit the collimated light into the light guide plate.

8. The backlight unit according to claim 6 or 7, wherein the light guide plate is formed to have a taper shape whose thickness becomes thinner as a distance from the light emitting unit becomes larger.

9. The backlight unit according to claim 8, wherein the first reflecting surface and the second reflecting surface are subjected to coating or have patterns.

10. The backlight unit according to claim 9, further comprising a diffusion plate configured to diffuse a light from the light guide plate on an emission surface of the light guide plate.

11. A display device having a multi-reflecting structure, the device comprising:
an image generating unit configured to project an image light;
a first double reflecting plate configured to magnify the image light from the image generating unit in a first direction and double-reflect the magnified image light to emit the light in a second direction; and
a second double reflecting plate configured to magnify the image light emitted from the first double reflecting plate in the second direction and double-reflect the magnified image light to emit the light in a normal direction of a screen.

12. A display device having a multi-reflecting structure, the device comprising:
an image generating unit configured to project an image light;
a first double reflecting plate configured to magnify the image light from the image generating unit in a first direction and double-reflect the magnified image light to emit the light in a second direction; and
a second double reflecting plate configured to magnify the image light emitted from the first double reflecting plate in the second direction and double-reflect the magnified image light to emit the light in a third direction; and
a third double reflecting plate configured to magnify the image light emitted from the second double reflecting plate in the third direction and double-reflect the magnified image light to emit the light in a normal direction of a screen.

13. A display device having a multi-reflecting structure, the device comprising:
an image generating unit configured to project an image light;
a diffusion lens configured to receive the image light from the image generating unit and diffuse the light in a first axis direction;
a collimate lens configured to convert the image light diffused in the diffusion lens into a collimated light; and
a double reflecting plate configured to magnify the image light emitted from the collimate lens in a second direction and double-reflect the magnified image light to emit the light in a normal direction of a screen.

14. The display device according to one of claims 11 through 13, wherein each of the double reflecting plates comprises:
a light guide plate configured to receive the image light and magnify the light in its progress direction; and
a reflecting plate formed on a rear surface of the light guide plate and having at least one or more double reflecting surfaces configured to double-reflect the image light magnified in the light guide plate and change its progress direction at 90° or close to 90°.

15. The display device according to claim 14, wherein the light guide plate is formed to have a taper shape whose thickness becomes thinner as a distance from the light emitting unit becomes larger.

16. The display device according to claim 14, wherein the double reflecting surface of the reflecting plate comprises:
a first reflecting surface configured to first reflect a light, which is incident upon the light guide plate, in a direction opposite to a front surface of the corresponding light guide plate; and
a second reflecting surface configured to second reflect the light reflected from the first reflecting surface in a normal direction on the front surface of the corresponding light guide plate.

17. A display device having a multi-reflecting structure, the device comprising:
an image generating unit configured to project an image light;

a first refraction/reflection plate configured to receive the image light emitted from the image generating unit, and refract and reflect the light to emit the light in a first direction; and a second refraction/reflection plate configured to receive the image light emitted from the first refraction/reflection plate, and refract and reflect the light to emit the light in a normal direction of a screen.

18. A display device having a multi-reflecting structure, the device comprising:

an image generating unit configured to project an image light;

a first refraction/reflection plate configured to receive the image light emitted from the image generating unit, and refract and reflect the light to emit the light in a first direction;

a second refraction/reflection plate configured to receive the image light emitted from the first refraction/reflection plate, and refract and reflect the light to emit the light in a second direction; and a third refraction/reflection plate configured to receive the image light emitted from the second refraction/reflection plate, and refract and reflect the light to emit the light in a normal direction of a screen.

19. A display device having a multi-reflecting structure, the device comprising:

an image generating unit configured to project an image light;

a diffusion lens configured to receive the image light emitted from the image generating unit and diffuse the light in a first axis direction;

a collimate lens configured to convert the image light diffused in the diffusion lens into a collimated light; and a refraction/reflection plate configured to receive the image light emitted from the collimate lens, and refract and reflect the light to emit the light in a normal direction of a screen.

20. The display device according to one of claims 17 through 19, wherein the refraction/reflection plate is formed to have a taper shape whose thickness is changed at a predetermined angle.

21. The display device according to claim 20, wherein the refraction/reflection plate comprises:

a refractive surface configured to refract an incident image light, the refracted incident image light penetration the refractive surface; and a reflecting surface configured to reflect regularly the image light which has penetrated the refractive surface and re-progress the image light into the refractive surface.

22. The display device according to claim 21, wherein the refraction/reflection plate is formed so that an angle between the refractive surface and a progress direction of an externally incident light is the same as a refractive angle of which the image light reflected from the reflecting surface, is refracted when the image light penetrates the refractive surface.

\* \* \* \* \*